US011528295B2

United States Patent
Meriot

(10) Patent No.: US 11,528,295 B2
(45) Date of Patent: Dec. 13, 2022

(54) METHODS AND SYSTEMS FOR DEFENDING AN INFRASTRUCTURE AGAINST A DISTRIBUTED DENIAL OF SERVICE ATTACK

(71) Applicant: OVH, Roubaix (FR)

(72) Inventor: Sebastien Meriot, Mouvaux (FR)

(73) Assignee: OVH, Roubaix (FR)

( * ) Notice: Subject to any disclaimer, the term of this patent is extended or adjusted under 35 U.S.C. 154(b) by 198 days.

(21) Appl. No.: 16/441,828

(22) Filed: Jun. 14, 2019

(65) Prior Publication Data
US 2020/0007575 A1 Jan. 2, 2020

(30) Foreign Application Priority Data

Jun. 30, 2018 (EP) ..................................... 18315013

(51) Int. Cl.
*H04L 9/40* (2022.01)
*G06F 21/56* (2013.01)

(52) U.S. Cl.
CPC ........ *H04L 63/1458* (2013.01); *G06F 21/562* (2013.01); *H04L 63/145* (2013.01);
(Continued)

(58) Field of Classification Search
CPC ............. H04L 63/1458; H04L 63/1491; H04L 63/145; H04L 63/1483; G06F 21/562
See application file for complete search history.

(56) References Cited

U.S. PATENT DOCUMENTS

| 7,603,709 B2 | 10/2009 | Lewis et al. |
| 7,694,339 B2 | 4/2010 | Blake et al. |

(Continued)

FOREIGN PATENT DOCUMENTS

| CN | 101087196 B | 1/2011 |
| CN | 102790778 A | 11/2012 |

(Continued)

OTHER PUBLICATIONS

"Botnet", Wikipedia (https://en.wikipedia.org/wiki/Botnet: Jun. 29, 2018); archived at Wayback Machine (https://web.archive.org/web/20180629101723/https://en.wikipedia.org/wiki/Botnet). (Year: 2018).*

(Continued)

*Primary Examiner* — Kari L Schmidt
(74) *Attorney, Agent, or Firm* — BCF LLP

(57) ABSTRACT

Methods and systems for defending an infrastructure against a distributed denial of service (DDoS) attack use a software decoy installed in the infrastructure to deliberately attract a malware. An address or a domain name of a command and control (C&C) server is extracted from the malware. A client of the infrastructure uses the address or the domain name of the C&C server to connect to the C&C server. The client receives a command intended by the C&C server to cause the client to participate in the DDoS attack. The client forwards particulars of the DDoS attack to a cleaning component. The cleaning component discards incoming signals having one or more of the particulars of the DDoS attack. The address or domain name of the C&C server may be obfuscated in the malware, in which case reverse engineering is used to decipher the malware.

18 Claims, 11 Drawing Sheets

(52) U.S. Cl.
CPC ...... *H04L 63/1483* (2013.01); *H04L 63/1491* (2013.01); *G06F 2221/033* (2013.01); *H04L 2463/142* (2013.01); *H04L 2463/146* (2013.01)

(56) References Cited

U.S. PATENT DOCUMENTS

| | | | |
|---|---|---|---|
| 7,770,223 B2 | 8/2010 | Shevenell et al. | |
| 8,204,984 B1* | 6/2012 | Aziz | H04L 63/20 709/224 |
| 8,561,188 B1* | 10/2013 | Wang | H04L 63/1425 713/176 |
| 8,566,928 B2* | 10/2013 | Dagon | H04L 63/1441 726/22 |
| 8,606,898 B1 | 12/2013 | Phatak | |
| 8,819,825 B2 | 8/2014 | Keromytis et al. | |
| 8,832,836 B2 | 9/2014 | Thomas et al. | |
| 9,009,829 B2 | 4/2015 | Stolfo et al. | |
| 9,027,135 B1* | 5/2015 | Aziz | H04L 63/1491 726/23 |
| 9,270,690 B2 | 2/2016 | Kraitsman et al. | |
| 9,350,758 B1 | 5/2016 | Aharoni et al. | |
| 9,356,942 B1 | 5/2016 | Joffe | |
| 9,628,505 B2* | 4/2017 | Ho | H04L 47/33 |
| 9,762,596 B2* | 9/2017 | Wang | H04L 63/1416 |
| 9,942,270 B2 | 4/2018 | Vissamsetty et al. | |
| 10,097,511 B2* | 10/2018 | Sullivan | H04L 61/4511 |
| 10,176,325 B1* | 1/2019 | Hou | G06F 21/56 |
| 10,320,810 B1* | 6/2019 | Xu | H04L 63/1408 |
| 10,362,057 B1* | 7/2019 | Wu | H04L 63/1408 |
| 10,516,680 B1* | 12/2019 | Vervier | H04L 63/1416 |
| 11,038,906 B1* | 6/2021 | Bingham | H04L 41/12 |
| 2002/0087882 A1* | 7/2002 | Schneier | H04L 63/20 726/23 |
| 2009/0037592 A1* | 2/2009 | Lyon | H04L 29/06027 709/228 |
| 2010/0162350 A1* | 6/2010 | Jeong | H04L 63/1416 726/1 |
| 2012/0079596 A1* | 3/2012 | Thomas | G06F 21/566 726/24 |
| 2012/0084860 A1* | 4/2012 | Cao | H04L 63/1441 726/23 |
| 2013/0263226 A1* | 10/2013 | Sudia | H04L 63/08 726/4 |
| 2014/0317739 A1* | 10/2014 | Be'ery | H04L 63/16 726/23 |
| 2015/0047032 A1 | 2/2015 | Hannis et al. | |
| 2015/0326587 A1* | 11/2015 | Vissamsetty | H04L 63/1491 726/23 |
| 2016/0080415 A1 | 3/2016 | Wu et al. | |
| 2016/0164894 A1* | 6/2016 | Zeitlin | H04L 63/1416 726/23 |
| 2016/0308898 A1* | 10/2016 | Teeple | H04L 63/1441 |
| 2016/0328742 A1* | 11/2016 | Shiravi Khozani | G06F 21/53 |
| 2017/0026387 A1* | 1/2017 | Vissamsetty | H04L 63/00 |
| 2017/0171244 A1* | 6/2017 | Vissamsetty | H04L 63/1425 |
| 2017/0180312 A1* | 6/2017 | Sullivan | H04L 61/3025 |
| 2017/0201536 A1* | 7/2017 | Antonakakis | H04L 61/1511 |
| 2017/0223046 A1* | 8/2017 | Singh | H04L 63/1491 |
| 2017/0289191 A1* | 10/2017 | Thioux | H04L 63/1441 |
| 2018/0337941 A1* | 11/2018 | Kraning | H04L 43/16 |
| 2019/0253453 A1* | 8/2019 | Vissamsetty | H04L 63/10 |
| 2019/0266327 A1* | 8/2019 | Satpathy | G06F 21/6218 |
| 2021/0058411 A1* | 2/2021 | Nakatani | H04L 63/1425 |

FOREIGN PATENT DOCUMENTS

| | | |
|---|---|---|
| CN | 103051615 B | 7/2015 |
| JP | 5655191 B2 | 1/2015 |
| JP | 2015222471 A | 12/2015 |

OTHER PUBLICATIONS

L. Liu, O. De Vel, Q.-L. Han, J. Zhang and Y. Xiang, "Detecting and Preventing Cyber Insider Threats: A Survey," in IEEE Communications Surveys & Tutorials, vol. 20, No. 2, pp. 1397-1417, Secondquarter 2018. (Year: 2018).*

V. R. Kebande, L. Mlotshwa and N. M. Karie, "Botnet's Obfuscated C&C Infrastructure Take-down Approaches Based on Monitoring Centralized Zeus Bot Variant's Propagation Model," 2019 IST-Africa Week Conference (IST-Africa), 2019, pp. 1-10. (Year: 2019).*

Won Kim, Ok-Ran Jeong, Chulyun Kim, and Jungmin So. 2010. On botnets. In Proceedings of the 12th International Conference on Information Integration and Web-based Applications & Services (iiWAS '10). Association for Computing Machinery, New York, NY, USA, 5-10. (Year: 2010).*

S. Arshad, M. Abbaspour, M. Kharrazi and H. Sanatkar, "An anomaly-based botnet detection approach for identifying stealthy botnets," 2011 IEEE International Conference on Computer Applications and Industrial Electronics (ICCAIE), 2011, pp. 564-569. (Year: 2011).*

European Search Repod with regard to the counterpad EP Patent Application 18315013.5 completed Dec. 19, 2018.

Deshpande, "HoneyMesh: Preventing Distributed Denial of Service Attacks using Virtualized Honeypots", International Journal of Engineering Research & Technology, 2015, vol. 4, Issue 8., pp. 263-267.

Chinn, "Botnet Detection: Honeypots and the Internet of Things", MS MIS Candidate (2015), Eller College of Management, 40 pages.

Moon et al., "A Hybrid Defense Technique for ISP Against the Distributed Denial of Service Attacks", Applied Mathematics & Information Sciences, 2014, vol. 8, No. 5, pp. 2347-2359.

English Abstract for CN 102790778 retrieved on Espacenet on Jun. 12, 2019.

English Abstract for CN103051615 retrieved on Espacenet on Jun. 12, 2019.

English Abstract for CN101087196 retrieved on Espacenet on Jun. 12, 2019.

English Abstract for JP5655191 retrieved on Espacenet on Jun. 12, 2019.

English Abstract for JP2015222471 retrieved on Espacenet on Jun. 12, 2019.

MERIOT, "Automation Of Internet-of-Things Botnets Takedown By An ISP", 2017, 23 pages.

Pepin, "La methode d'OVH pour démanteler les réseaux d'objets connectés zombies", 2018, https://www.nextinpact.com/news/106860-la-methode-dovh-pour-demanteler-reseaux-dobjets-connectes-zombies.htm, (6 pages, pdf).

"Alerting Overview", Datadog Docs, https://docs.datadoghq.com/monitors/#overview, (5 pages, pdf).

Pa Pa et al., "IoTPOT: Analysing the Rise of IoT Compromises", 9th USENIX Workshop on Offensive Technologies (WOOT 15), 2015, 9 pages.

OVH, "Find out more about OVH" ovh.com, Jul. 2017, https://www.ovh.ie/aboutus/, (3 pages, pdf).

Meriot, "The DDoS that didn't break the camel's VAC", ovh.com, Oct. 2016, https://www.ovh.com/ca/en/a2367.the-ddos-that-didntbreak-the-camels-vac, (7 pages, pdf).

Oosterhof, Cowrie Honeypot, micheloosterhof.com, Jul. 2017, http://www.micheloosterhof.com/cowrie.org/, (2 pages, pdf).

MERIOT, "Automation Of Internet-of-Things Botnets Takedown By An ISP", 2017, https://www.botconf.eu/2017/automation-of-internet-of-things-botnets-takedown-by-an-isp/, (3 pages, pdf).

* cited by examiner

```
Jun 26 16:20:27 - !* GTFONIGG!* GTFOFAG
Jun 26 16:20:27 - !* GTFODUP
Jun 26 16:25:19 - !* STD .XX.XXX.XXX.70 443 200
Jun 26 16:34:15 - !* STD .XX.XXX.XXX.104 5355 200
Jun 26 16:34:37 - !* UOP .XX.XXX.XXX.104 433 200 32 0 1
Jun 26 16:34:48 - !* STOPATTK
Jun 26 16:34:57 - !* GTFONIGG!* GTFOFAG
Jun 26 16:34:57 - !* GTFODUP
Jun 26 16:35:26 - !* STD .XX.XXX.XXX.101 443 100
Jun 26 16:37:09 - !* STOPATTK
Jun 26 16:37:44 - !* STD .XX.XXX.XXX.100 5355 200
Jun 26 16:37:51 - !* STOPATTK
Jun 26 16:42:26 - !* STD .XX.XXX.XXX.67 443 100
Jun 26 16:43:09 - !* STD .XX.XXX.XXX.67 22 200
Jun 26 16:45:00 - !* STD .XX.XXX.XXX.42 23 200
Jun 26 16:47:40 - !* STD .XX.XXX.XXX.42 443 200
Jun 26 16:51:18 - !* STD .XX.XXX.XXX.214 443 200
Jun 26 16:52:53 - !* STD .XX.XXX.XXX.74 5355 200
Jun 26 16:53:08 - !* STD .XX.XXX.XXX.74 21 200
Jun 26 16:54:30 - !* SCANNER ON
Jun 26 16:54:30 - !* FATCOCK
Jun 26 16:56:43 - !* STD .XX.XXX.XXX.74 21 200
Jun 26 16:56:50 - !* STD .XX.XXX.XXX.74 443 200
Jun 26 16:56:57 - !* STOPATTK
Jun 26 17:23:13 - !* GTFONIGG!* GTFOFAG
```

Figure 6

METHODS AND SYSTEMS FOR DEFENDING AN INFRASTRUCTURE AGAINST A DISTRIBUTED DENIAL OF SERVICE ATTACK

CROSS-REFERENCE

The present application claims priority from European Patent Application no 18315013.5 filed on Jun. 30, 2018, the disclosure of which is incorporated by reference herein in its entirety.

FIELD

The present technology relates to the field of Internet security. In particular, the systems and methods for defending an infrastructure against a distributed denial of service attack.

BACKGROUND

Internet-Of-Things (IoT) is a concept related to the capabilities of physical devices having processing capabilities, for example vehicles, home appliances, wireless routers, printers, security cameras, and other devices, to communicate using the Internet protocol. A growing number of devices have communication capabilities and thus capable of offering services that were unthinkable in the past. Unfortunately, IoT devices are oftentimes not well equipped to resist to threats such as those coming from malwares, a term used to refer to various types of computer viruses and worms. An example of a poorly protected device is a wireless router or a printer for domestic use when the owner has not modified the original security settings of the device.

Recently, Internet-Of-Things botnets have made the headlines. An IoT device may be infected and become a "bot", a term derived from "robot", when it is infected by a malware. Such malware spreads from peer to peer, i.e. from an IoT device to another, each device becoming a bot. Once a device is infected, it scans the Internet seeking for new vulnerable devices to infect. For some malwares, the infected device sends a copy of the malware to the new device, which in turn becomes infected. For other malwares, once a bot finds a new vulnerable device, it forwards a report to a "reporter" in charge infecting the new device. In any case, the malware spreads quickly to a large number of infected devices. These infected devices are arranged into a "botnet", which is a network of such bots.

A botnet including a large number of bots can be used to cause a distributed denial of service (DDoS) attack on a computer system, for example a large datacenter. A DDoS attack causes the datacenter to be flooded with superfluous requests. When under such an attack, the datacenter processing and communicating capabilities may become so overloaded that it is temporarily unable to provide service to legitimate users and clients. In at least one event, an attack imposed a load of one (1) terabit per second on an enterprise infrastructure. Because the attack is delivered through a large number of sources, i.e. a large number of bots, having thousands of distinct Internet Protocol (IP) addresses, blocking the attack cannot be achieved by blocking a single source. Given that a DDoS attack may involve such large numbers of IP addresses, some of which being assigned to devices that were legitimate before being infected, a simple blacklisting of potentially harmful IP addresses is not an efficient solution. IP addresses are frequently dynamically assigned, so blacklisting may lead to eventually blocking legitimate devices.

Some of the most potent malwares that have been recently discovered include QBOT (also called Bashlite or LizKebab), Mirai (also called Persira, among other variants), Kaiten (also called Tsunami) and Mr. Black. Some originators of malwares have published their source code online, allowing other people to develop modified copies that are not readily discoverable by Internet security software tools. New malwares are placed on line on a continuous basis.

As expressed hereinabove, the botnet is initially created by infection of legitimate devices, for example IoT devices, by a malware. The bots thus created are made to communicate with a dedicated server, called a Command & Control (C&C) server. FIG. 1 (Prior Art) illustrates an example of network in which a C&C server causes a number of legitimate devices to be infected. In a network 10, a C&C server 12 discovers a first set of vulnerable devices, for example a device 14. The device 14 may be accessible without a password or by use of an easily discovered password such as those that are frequently assigned by default by device vendors. The C&C server 12 may also exploit other vulnerabilities of the device 14, for example a "remote code execution" security vulnerability. Having logged into the device 14, the C&C server 12 uploads a malware into the device 14, which becomes infected and turns into a bot. The malware causes the device 14 to search through the Internet 16 for other vulnerable devices 18, 20 and 22. These devices 18, 20 and 22 may for example be accessible via various Transmission Control Protocol (TCP) ports such as, without limitation, ports 22, 23 and 2323. Once the device 14 has identified the vulnerable devices 18, 20 and 22, it sends their respective addresses to the C&C server 12. The C&C server 12 obtains access to the devices 18, 20 and 22 and uploads the malware therein; the devices 18, 20 and 22 turn into bots that also become operable to search for further vulnerable devices. This process explodes exponentially and thousands of vulnerable devices become infected and rapidly become part of the botnet.

In some instances, the C&C server may be a legitimate server that has been compromised by the actions of a hacker. In some jurisdictions, hosting service providers are legally barred from examining the information from their legitimate clients hosted in their datacenters. This may prevent the operator of the datacenter from easily discovering that one of its own servers is infected and has become a C&C server. The paradox in some cases is that a datacenter may be victim of an attack when the C&C server is part of the datacenter infrastructure.

Although service providers are oftentimes prevented from scrutinizing the information hosted on their datacenters, this legal requirement preventing a possible manner of mediating the infection of their own servers, they are still responsible for taking appropriate actions to remediate abuse of their service and to thereby continue serving their customers. To this end, abuse remediation solutions may rely on reports sent by third parties, these solutions being too slow to be efficient in many cases.

Time is often critical when it comes to abuse because customers demand continuous access to their data and to their services.

Conventional mitigation solutions are slow to react. Although some solutions have been shown to react within 30 seconds, this delay may actually exceed the duration of a DDoS attack, in which cases the mitigation is essentially fruitless. When the attack imposes a load of one (1) terabit per second on an infrastructure, the damage is very significant, despite the short duration.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise the delays of current mitigation solutions that may actually exceed the duration of a DDoS attack.

In one aspect, various implementations of the present technology provide a method for defending an infrastructure against a distributed denial of service (DDoS) attack, the method comprising:
  installing a software decoy in the infrastructure;
  receiving, at the software decoy, a malware intended to infect the software decoy;
  extracting from the malware an address or a domain name of a command and control (C&C) server;
  using the address or the domain name of the C&C server to connect a client of the infrastructure to the C&C server;
  receiving, at the client, a command intended by the C&C server to cause the client to participate in the DDoS attack;
  forwarding particulars of the DDoS attack from the client to a cleaning component; and
  discarding, in the cleaning component, incoming signals having at least one of the particulars of the DDoS attack.

In some implementations of the present technology, the software decoy is configured to pose as a vulnerable device, the method further comprising, before receiving the malware at the software decoy: receiving, at the software decoy, a challenge intended to detect a protection function of the infrastructure; and forwarding a challenge response from the software decoy.

In some implementations of the present technology, the particulars of the DDoS attack comprise an address of an intended victim of the DDoS attack.

In some implementations of the present technology, forwarding the particulars of the DDoS attack to the cleaning component is conditional to the intended victim being part of the infrastructure, the method further comprising updating a routing table of the infrastructure to cause routing of incoming messages destined to the address of the intended victim toward the cleaning component when the intended victim is part of the infrastructure.

In some implementations of the present technology, discarding, in the cleaning component, the incoming signals having at least one of the particulars of the DDoS attack comprises an element selected from discarding incoming signals carrying spoofed source IP addresses, discarding incoming signals that are not related to previously established connections, discarding incoming signals when a number of incoming signals carrying a same source IP address exceeds a predetermined threshold, and a combination thereof.

In some implementations of the present technology, extracting from the malware the address or the domain name of the C&C server comprises: verifying whether the malware is encrypted; directly reading the address or the domain name of the C&C server if the malware is not encrypted; if the malware is encrypted, using one or more previously detected ciphering keys of known malwares to decipher the malware; verifying whether the malware is still encrypted after using the one or more previously detected ciphering keys; and if the malware is still encrypted, performing an automatic, static analysis of a binary of the malware.

In some implementations of the present technology, performing the automatic, static analysis of the binary of the malware comprises: locating a predetermined machine language instruction sequence in the malware; locating a ciphering key on which the predetermined machine language instruction sequence is applied in the malware; extracting the ciphering key from the malware; deciphering the malware using the ciphering key; and locating the address or the domain name of the C&C server in the deciphered malware.

In some implementations of the present technology, the method further comprises: determining whether a downloader of the malware or the C&C server is hosted in the infrastructure by verifying the address or the domain name of the downloader of the malware or of the C&C server; and if the downloader of the malware or the C&C server is hosted in a compromised component of the infrastructure, performing an action selected from alerting a customer having content hosted in the compromised component of the infrastructure, placing the compromised component of the infrastructure in quarantine, and a combination thereof.

In other aspects, various implementations of the present technology provide a system for defending an infrastructure against a distributed denial of service (DDoS) attack, the system comprising:
  a first computer program implementing a cleaning component adapted to discard incoming signals having at least one particular of a DDoS attack;
  a second computer program configured to pose as a software decoy and adapted to receive a malware intended to infect the software decoy;
  a third computer program implementing a control and command (C&C) data collector adapted to:
    receive the malware from the software decoy; and
    extract from the malware an address or a domain name of a C&C server; and
  a fourth computer program configured to pose as a client and adapted to:
    receive the address or the domain name of the C&C server from the C&C data collector;
    use the address or the domain name of the C&C server to connect to the C&C server,
    receive, a command intended by the C&C server to cause the client to participate in the DDoS attack, and
    forward particulars of the DDoS attack to the cleaning component.

In some implementations of the present technology, the system further comprises a plurality of interconnected computer platforms, wherein: functions of the cleaning component, of the software decoy, of the C&C data collector and of the client are implemented on the plurality of interconnected computer platforms; each computer platform comprises at least one processor and at least one memory operatively connected to the at least one processor; and in each computer platform, the memory comprises a non-transitory storage medium having stored thereon instructions that the processor of the computer platform reads and executes to implement one or more functions installed on the computer platform.

In some implementations of the present technology, the C&C data collector is further adapted to extract from the malware the address or the domain name of the C&C server by: directly reading the address or the domain name of the C&C server if the malware is not encrypted; using one or more previously detected ciphering keys of known malwares to decipher the malware server if the malware is encrypted; and if the malware is still encrypted after using the one or more previously detected ciphering keys, performing an automatic, static analysis of a binary of the malware.

In some implementations of the present technology, the C&C data collector is further adapted to perform the automatic, static analysis of the binary of the malware by: locating a predetermined machine language instruction sequence in the malware; locating a ciphering key on which the predetermined machine language instruction sequence is applied in the malware; extracting the ciphering key from the malware; deciphering the malware using the ciphering key; and locating the address or the domain name of the C&C server in the deciphered malware.

In some implementations of the present technology, the predetermined machine language instruction sequence comprises one or more instructions including at least one rarely used instruction.

In some implementations of the present technology, wherein the software decoy does not install the malware.

In some implementations of the present technology, the system is further adapted to: determine whether a downloader of the malware or the C&C server is hosted in the infrastructure by verifying the address or the domain name of the downloader of the malware or of the C&C server; and if the downloader of the malware or the C&C server is hosted in a compromised component of the infrastructure, cause the infrastructure to perform an action selected from alerting a customer having content hosted in the compromised component of the infrastructure, placing the compromised component of the infrastructure in quarantine, and a combination thereof.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6 is an actual example of a log of commands detected at the infrastructure;

Figure 1:
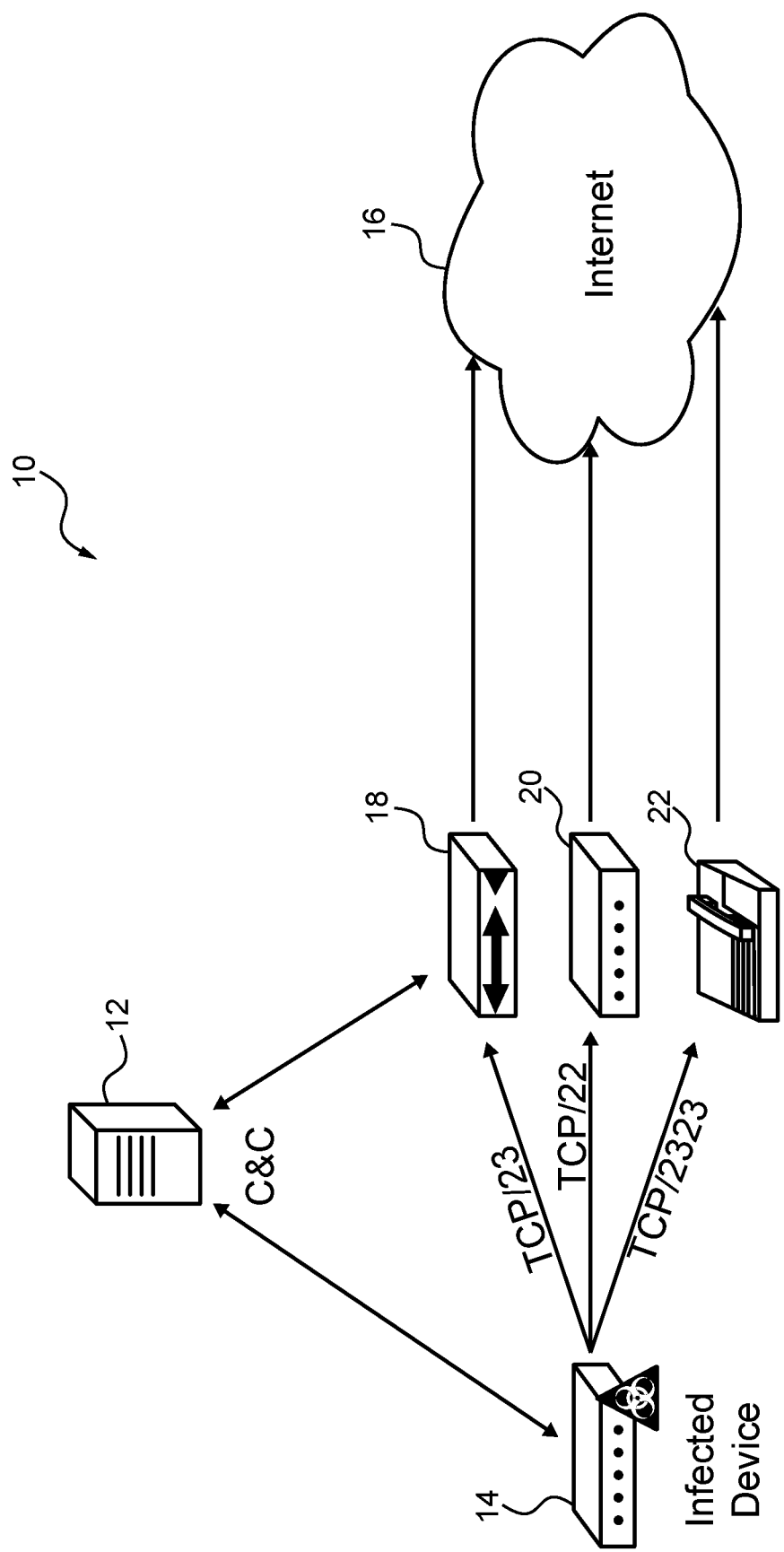
FIG. 1 (Prior Art) illustrates an example of network in which a C&C server causes a number of legitimate devices to be infected.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples of systems and methods adapted to defend an infrastructure against a distributed denial of service (DDoS) attack.

Infrastructure

Figure 2:
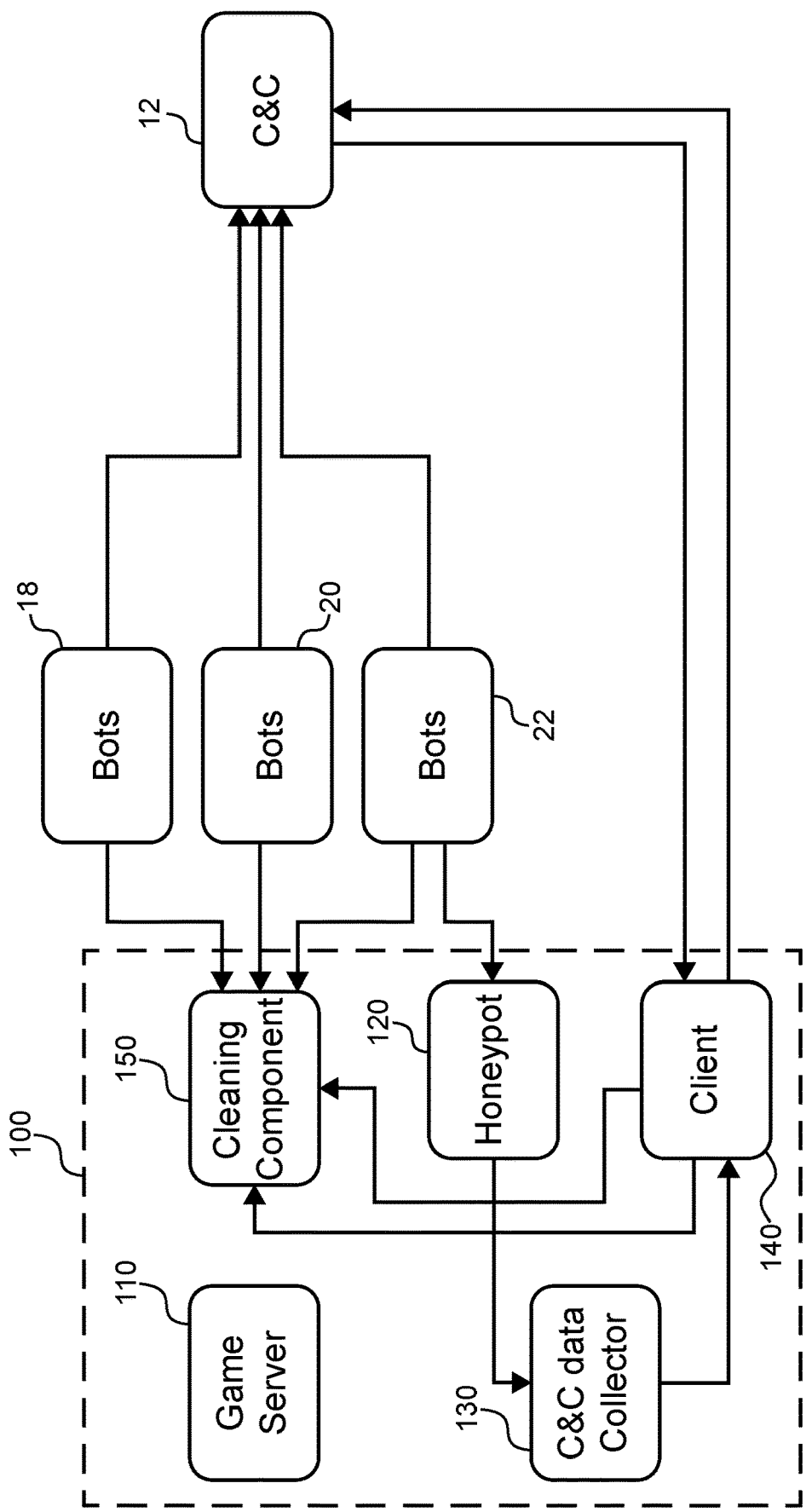
FIG. 2 is a block diagram of an infrastructure implementing a method and a system for defending against a DDoS attack in accordance with an embodiment of the present technology.

Referring now to the drawings, FIG. 2 is a block diagram of an infrastructure implementing a method and a system for defending against a DDoS attack in accordance with an embodiment of the present technology. An infrastructure 100 may for example represent a data center, or a plurality of data centers, providing hosting services for one or more customers. In the example of FIG. 2, a game server 110 owned by a customer of the infrastructure operator is hosted in the infrastructure 100. It will be appreciated that the infrastructure 100 may include a large number of servers for hosting services for a large number of customers and that the infrastructure 100 may be distributed over a plurality of datacenters (not shown) for redundancy, reliability and/or load sharing purposes. The datacenters forming the infrastructure 100 may be geographically distributed, for example worldwide. The illustrated infrastructure 100 of FIG. 2 is heavily simplified for ease of illustration.

For defensive purposes, specific applications are installed on computer platforms (shown on a later Figure) of the infrastructure 100, for example computers or servers, to form a system for defending the infrastructure 100 against DDoS attacks. One such application is a software decoy 120, sometimes called a "honeypot", which is configured to pose as a vulnerable device that could easily be infected by a malware. The software decoy 120 has simple login credentials that mimic those that are generally conferred by default to simple devices. For example, the login credentials may include a login identity such as "root" and a password that is simply set to "password". The software decoy 120 may also attempt to detect remote code execution (RCE) attacks. The software decoy 120 is intended to download a malware but to refrain from installing the malware. Another application of the system is a C&C data collector 130 configured to extract information from the malware received at the software decoy 120. A further application of the system is a client 140 that is configured to pose as an infected device. Yet another application of the system is a cleaning component 150. Although a single software decoy 120, a single C&C data collector 130, a single client 140 and a single cleaning component 150 are shown, any one of these components may be replicated into a plurality of components in the infrastructure 100.

In an embodiment, all components of the infrastructure 100 may be co-located in a same installation, for example being part of a same datacenter. In another embodiment, some of the components of the infrastructure 100 may be distant from other components of the infrastructure 100, geographically separated components of the infrastructure communicating via the Internet or via a private network. In an illustrative but non-limiting example, servers providing services to customers of the infrastructure, for example the game server 110, may be installed in large numbers in many locations while, in the same example, components of the system for defending against DDoS attacks may be installed in a limited number of locations.

A server, which is usually but not necessarily outside of the infrastructure 100, is the command and control (C&C) server 12 of FIG. 1. The C&C server 12 may either be a server of a criminal entity or a legitimate server that has been infected by a malware. The C&C server 12 causes a device, which is usually legitimate but poorly protected, to become infected by the malware, turning the device into bots such as the bots 18, 20 and 22 of FIG. 1. Although just a few bots are illustrated, the infrastructure 100 may be subject to an attack from a botnet including thousands of bots. It is usually one of the bots 18, 20 and 22 that discover the software decoy 120 and attempt to infect it with the malware.

High Level Processes

Figure 3:
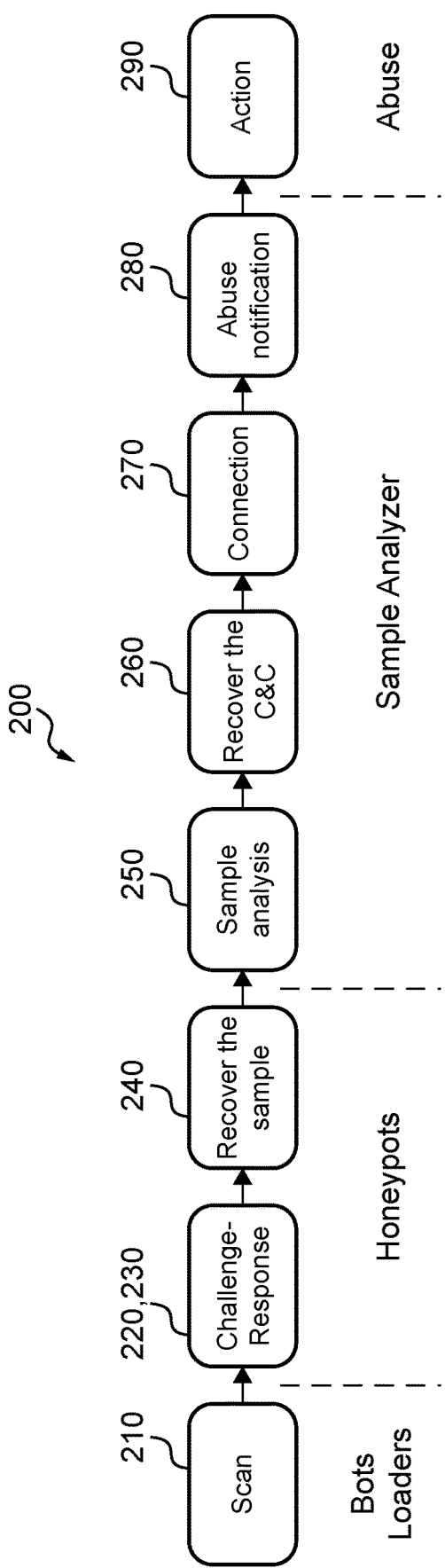
FIG. 3 is a high-level flowchart representing operations of a method for defending an infrastructure against a DDoS attack in accordance with an embodiment of the present technology.

FIG. 3 is a high-level flowchart representing operations of a method for defending an infrastructure against a DDoS attack in accordance with an embodiment of the present technology. A flowchart 200 starts with a scan 210 that actually take place in the C&C server 12 or a network (i.e. a botnet) formed by the bots 18, 20 and 22. The scan 210 is used in an attempt to find vulnerable devices in the Internet. The software decoy 120 (the "honeypot") is discovered during the scan 210. One of the bots 18, 20 or 22 successfully logs on the software decoy 120. Then, a challenge 220 is send to the software decoy 120; this challenge is sent in view of the fact that malware authors are aware of the concept of using honeypots and attempt to verify whether the device having responded to the scan 210 is in fact a honeypot. The software decoy 120 is configured to provide a response 230 to the challenge that corresponds to the expected response that a vulnerable device would actually send. For instance, the challenge may include a request for displaying the content of a file, or to display a hexadecimal character chain. The software decoy 120 replies accordingly. In a variant, the infrastructure 100 may include a plurality of software decoys 120 (i.e. a plurality of honeypots) that are each equipped to provide different challenge responses so that at least one of the software decoy 120 not identified as a honeypot by the attacker. The remainder of the flowchart 200 is based on the assumption that the botnet does not detect the true nature of the software decoy 120. A command carrying an Internet Protocol (IP) address or a uniform resource locator (URL) of a downloader of the malware for fetching and downloading the malware therefrom is received by the software decoy 120 at operation 240; this is illustrated on FIG. 3 as a honeypot recovering a sample software that is, in fact, the malware. This address is frequently the address of a web server intended to deliver the malware to vulnerable devices, although it may also be the address of the C&C server 12. The software decoy 120 downloads the malware and receives a command requesting installing the malware. The software decoy 120 does not actually install the malware. Following operations of the flowchart 200 include an analysis operation 250 of the malware by the C&C data collector 130 in order to recover, at operation 260, the address and the port number of the C&C server 12 or the domain name and the port number of the C&C server 12. A connection 270 is made to the C&C server 12 by the client 140, using this address. This connection operation 270 allows the client 140 to obtain further information about the C&C server 12, including without limitation particulars of an upcoming DDoS attack. The client 140 informs other components, for example the cleaning component 150, of the particular of the upcoming DDoS attack. If the address of the C&C server 12 is found to be part of the infrastructure 100, an "abuse" notification is forwarded at operation 280. The term "abuse" is used in this context because it is discovered that a server that is part of the infrastructure 100 has been infected to become the C&C server 12. Abuse mitigation procedures are initiated at operation 290. The abuse mitigation procedures may include a quarantine or a clean-up of the infected device of the infrastructure 100 turned into the C&C 12.

Figure 4:
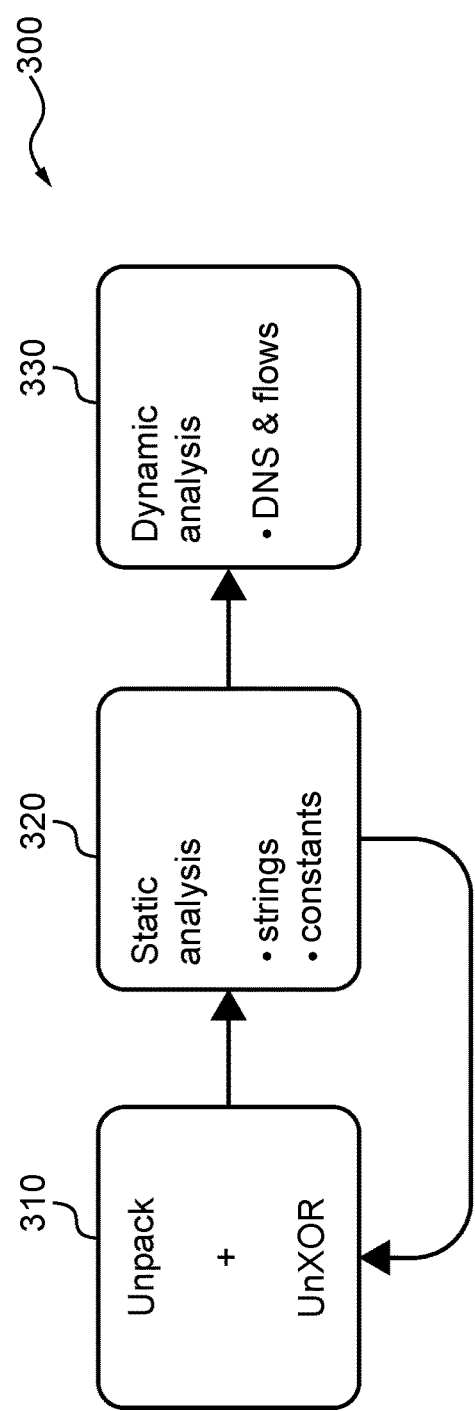
FIG. 4 is a high-level flowchart representing operations of an automated reverse engineering method for extracting an address or a domain name of a C&C server in accordance with an embodiment of the present technology.

FIG. 4 is a high-level flowchart representing operations of an automated reverse engineering method for extracting an address or a domain name of a C&C server in accordance with an embodiment of the present technology. A flowchart 300 essentially corresponds to operations 250 and 260 of FIG. 3. At operation 310, the malware may be unpacked, if the malware is packed when received, and a first ciphering key of a group of known ciphering keys (also called encryption keys) of a previously detected malware is applied thereto, using an exclusive-OR (XOR) operation, in an attempt to decipher the malware. A static analysis of the malware is made at operation 320 in an attempt to recover the address or domain name of the C&C server 12; this attempt may fail if the first ciphering key applied at operation 310 is not appropriate. If so, operation 310 is executed again using another known ciphering key. If none of the know ciphering keys applied at repeated operations 310 leads to successfully deciphering the malware at repeated operations 320, a dynamic analysis is attempted at operation 330. Details of this analysis will be described hereinbelow in relation to FIG. 8.

Detailed Defensive Process

Figure 5A:
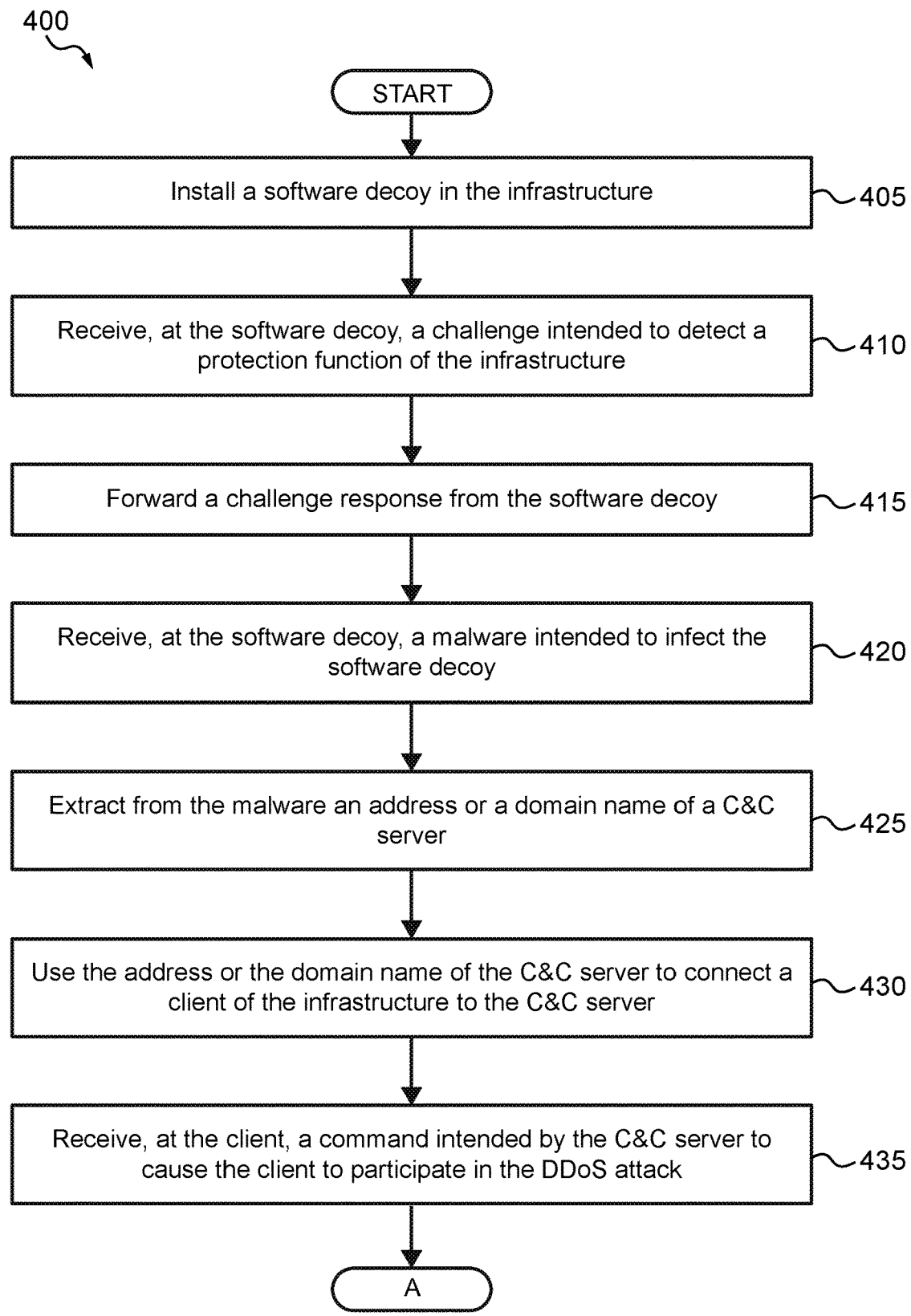
FIGS. 5A and 5B are a sequence diagram showing detailed operations of the method for defending an infrastructure against a DDoS attack in accordance with an embodiment of the present technology.
Figure 5B:
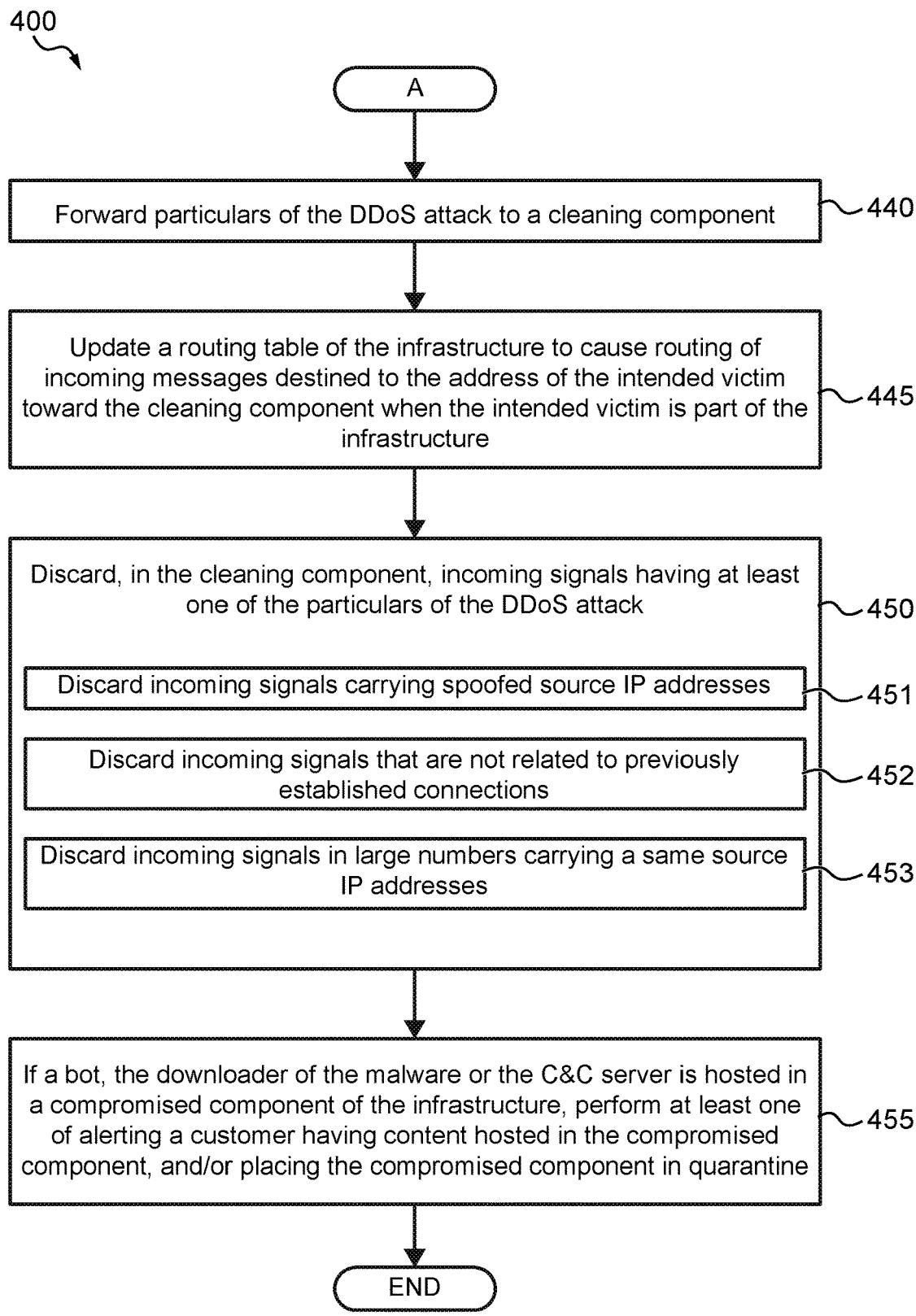

FIGS. 5A and 5B are a sequence diagram showing detailed operations of the method for defending an infrastructure against a DDoS attack in accordance with an embodiment of the present technology. On FIGS. 5A and 5B, a sequence 400 for defending an infrastructure against a DDoS attack comprises a plurality of operations that may be executed in variable order, some of the operations possibly being executed concurrently, some of the operations being optional. The sequence 400 shows operations that take place in various components of the infrastructure 100.

The sequence 400 is initiated at operation 405 by installing the software decoy in the infrastructure. As expressed hereinabove, the software decoy 120 is configured to pose as a vulnerable device. The software decoy 120 may receive, at operation 410, a challenge intended to detect a protection function of the infrastructure; otherwise stated, the challenge is intended to determine whether the software decoy 120 that has been located by the botnet functions as a honeypot. The challenge may be received from a bot. If the software decoy 120 detects that a source of the challenge is located in the infrastructure 100, for example when the challenge has a source IP address hosted in the infrastructure 100, the software decoy 120 may issue an abuse notification (operation 280 of FIG. 3). The software decoy forwards a challenge response at operation 415. Usually, this challenge response will suffice to hide the true nature of the software decoy 120 to the botnet. As expressed earlier, the infrastructure may include a plurality of software decoys 120 in the hope that at least one challenge response will trick the botnet in hiding the honeypot function of the software decoy 120. Implementing a large number of software decoy instances in the infrastructure 100 increases the probability that the botnet will rapidly discover one of the software decoys.

At operation 420, a malware intended to infect the software decoy 120 is received at the software decoy 120. A downloader of the malware may for example be a compromised web server. In at least one embodiment, the software decoy 120 does not actually install the malware. If the software decoy 120 detects that the downloader of the malware is located in the infrastructure 100, for example when the malware has a source IP address or a uniform resource locator (URL) hosted in the infrastructure 100, the software decoy 120 may issue an abuse notification. The software decoy 120 forwards the malware to the C&C data collector 130 that extracts therefrom an address or a domain name of the C&C server 12 at operation 425. If the C&C data collector 130 detects that the address of the domain name of the C&C server 12 belongs to the infrastructure 100, the C&C data collector 130 may issue an abuse notification. The address of the C&C server may be an IP address. The domain name of the C&C server may be part of a URL. A non-limiting example embodiment of operation 425 as performed by the C&C data collector 130 is provided hereinbelow, in the description of FIG. 8.

Using the address or the domain name of the C&C server 12, the client 140 connects to the C&C server 12 at operation 430. As expressed hereinabove, the client 140 is configured to pose as being infected by the malware. To this end, the client 140 may implement a known protocol of the malware. At operation 435, the client 140 receives a command intended by the C&C server 12 to cause the client 140 to participate in the DDoS attack. The connection between the client 140 and the C&C server 12 may be lost and automatically reinstated, in which case the client 140 may verify again the address or the domain name of the C&C server 12 in view of issuing an abuse notification, if applicable.

The particulars of the DDoS attack may comprise an address of an intended victim of the DDoS attack, for example the game server 110, a port number of the intended victim of the DDOS attack, an intended duration of the DDoS attack, and/or similar parameters. For example, FIG. 6 is an actual example of a log of commands detected at the infrastructure 100. On FIG. 6, actual IP addresses of legitimate systems, except for the least significant digits, are masked by hiding actual values with "x values" to protect the anonymity of actual owners of these addresses. A command detected on June 26, at 16:47:40, showed that a standard (STD) DDoS attack, actually a TCP flood, was commanded by the C&C server 12 to bots of the botnet. The DDoS attack was directed to IP address "xx.xxx.xxx.42", at port number 443, and had an intended duration of 200 seconds.

Returning to FIG. 5B, the client 140 forwards particulars of the DDoS attack to the cleaning component 150 at operation 440. In a variant, forwarding the particulars of the DDoS attack to the cleaning component 150 may be conditional to the intended victim being part of the infrastructure 100, as in the case of the game server 110 and as determined based on an address being par to the particulars of the DDOS attack. However, another variant in which the particulars of the DDoS attack are forwarded to another system or apparatus, for example another infrastructure, may also be contemplated; this could be the case, for example, when the operator and/or owner of the infrastructure 100 has an agreement with the operator of the other system or apparatus for cooperating in the prevention of DDoS attacks.

The infrastructure 100 may comprise a routing table used to direct incoming signals, messages and packets to an appropriate component of the infrastructure 100. In an embodiment, operation 445 comprises updating the routing table of the infrastructure 100 to cause routing of incoming messages destined to the address of the intended victim toward the cleaning component 150 when the intended victim is part of the infrastructure, as in the case of the game server 110. The border gateway protocol (BGP) or the open shortest path first (OSPF) protocol may be used to update the routing table. When the infrastructure 100 detects that the DDoS attack has ended, the routing table may recover its previous state. Any component of the infrastructure 100 may initiate operation 445.

At operation 450, the cleaning component 150 discards incoming signals having at least one of the particulars of the DDoS attack. In a non-limiting example, the particulars of the DDoS attack include an IP address and/or a port number of the intended victim and the cleaning component 150 may filter incoming signals, messages and/or packets having this IP address in the IP header and/or having this port number in their Transmission Control Protocol (TCP) header.

Operation 450 may include one or more of sub-operations 451, 452 and/or 453. At sub-operation 451, incoming signals carrying spoofed source IP addresses are discarded. At sub-operation 452, incoming signals that are not related to previously established connections are discarded. At sub-operation 453, incoming signals are discarded when a number of such signals from the same source IP address exceeds a predetermined threshold. Sub-operations 451, 452 and 453 represent non-limiting example embodiments of the operation 450 and the cleaning component 150 may apply other criteria for discarding incoming signals having at least one of the particulars of the DDoS attack.

If a bot, the downloader of the malware or the C&C server 12 is found to be hosted in the infrastructure 100, an abuse of the resources of the infrastructure 100 has been discovered. A customer of the infrastructure 100 may have content hosted in a server or other component of the infrastructure 100 that is compromised by the installation of the bot, of the downloader of the malware, or of the C&C server 12 in that compromised component. At operation 455, the customer may be alerted. Alternatively or in addition, the compromised component of the infrastructure 100 may be placed in quarantine. Any component of the infrastructure 100 may initiate operation 455.

Reverse Engineering

The present technology introduces several variants for extracting the address or domain name of the C&C server 12 that controls the botnet. Sometimes, the address or domain name may be contained in a character string of the malware that is not encrypted, for example in the case of the QBOT malware. In such cases, the extraction of the domain name or of the C&C server 12 is trivially done by the C&C data collector 130.

More frequently, the address or domain name and port number are hidden by encryption within the malware. Reverse engineering may be in these cases be used to uncover the address or domain name of the C&C server 12. Most malwares can be recognized by locating in a signature in their binary, the signature comprising for example a particular code sequence. For example, the malware MIRAI hides an IP address of the C&C 12 in an unsigned 32-bit integer value associated with machine language instructions dedicated to manipulating addresses. In the particular, non-limiting example of the Intel™ x86 instruction set, examination of the MOV and PUSH operation codes may reveal the IP address and a port number of the C&C server 12. When using other architectures, for example those using ARM™, MIPS™ or SPARC™ processors, other operation codes may be examined for the same purposes.

In a variant, reverse engineering uses a static analysis of the binary of the malware and automatically searches the address or domain name of the C&C server 12 by attempting to recognize a signature of the malware. For example, the above-mentioned MOV and PUSH operation codes may also be used to recuperate a ciphering key hidden in the malware. Character strings in the malware may be encoded to not be easily recognizable or extractable from the binary code of the malware. An exclusive OR (XOR) operation may be made between hidden character strings and the ciphering key to uncover some malware content. The ciphering key is usually hardcoded in the binary, but may change from one malware to another.

Figure 7:
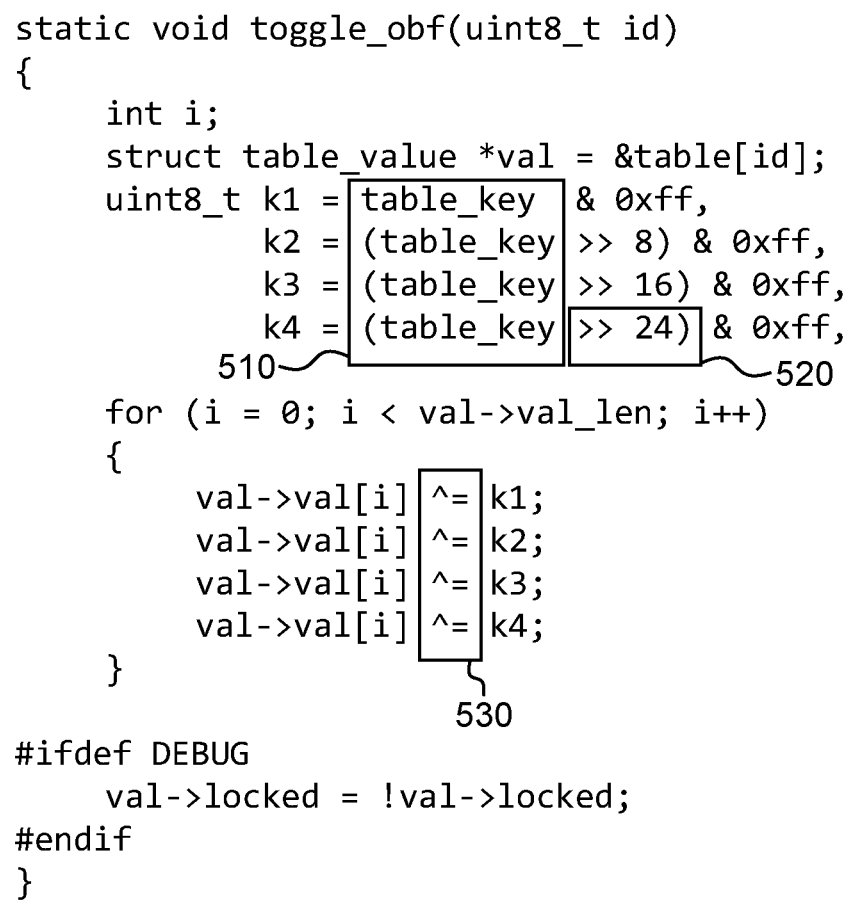
FIG. 7 is an illustration of a routine used by the malware MIRAI to encrypt character chains.

In an embodiment, the ciphering key is automatically recuperated by searching for a predetermined operation code sequence that is indicative of a ciphering routine used in the malware. This opcode sequence may contain other operation codes besides PUSH and MOV. As a non-limiting example, FIG. 7 is an illustration of a routine used by the malware MIRAI to encrypt character chains. A On FIG. 7, a routine 500 defines a value 510 labelled "table_key". The table_key 510 is placed in variables k1, k2, k3 and k4 using SHIFT operation codes. A SHIFT 24 operation code 520 actually shifts the table_key 510 by 24 bits into variable k4. While SHIFT operations by 8 or 16 bits are not uncommon, the SHIFT 24 operation code 520 is an infrequently (or rarely) used operation code and provides a clue to the reverse engineering process of the location of the ciphering key. Otherwise stated, the SHIFT 24 operation code 520 is part of a signature of the malware MIRAI. Previous experience acquired from reverse engineering applied to other malwares may be put to use to identify specific operation codes as potential markers for corresponding malwares.

The variables k1, k2, k3 and k4, which include k4 that is the object of the SHIFT 24 operation code 520, are used in XOR operations 530. The application of the XOR operations 530 on the variable k4 having be the object of the SHIFT 24 operation code 520 provides a strong clue that the table_key 510 is actually the ciphering key that may be used to decipher the malware and then to extract the address or the domain name of the C&C server 12. A value is read from the EAX register and shifted using a "mov eax, dword <addr>" instruction. The address <addr> is read. Inspection of an unsigned 32-bit integer (uint32) value at the address <addr> reveals the ciphering key.

Figure 8:
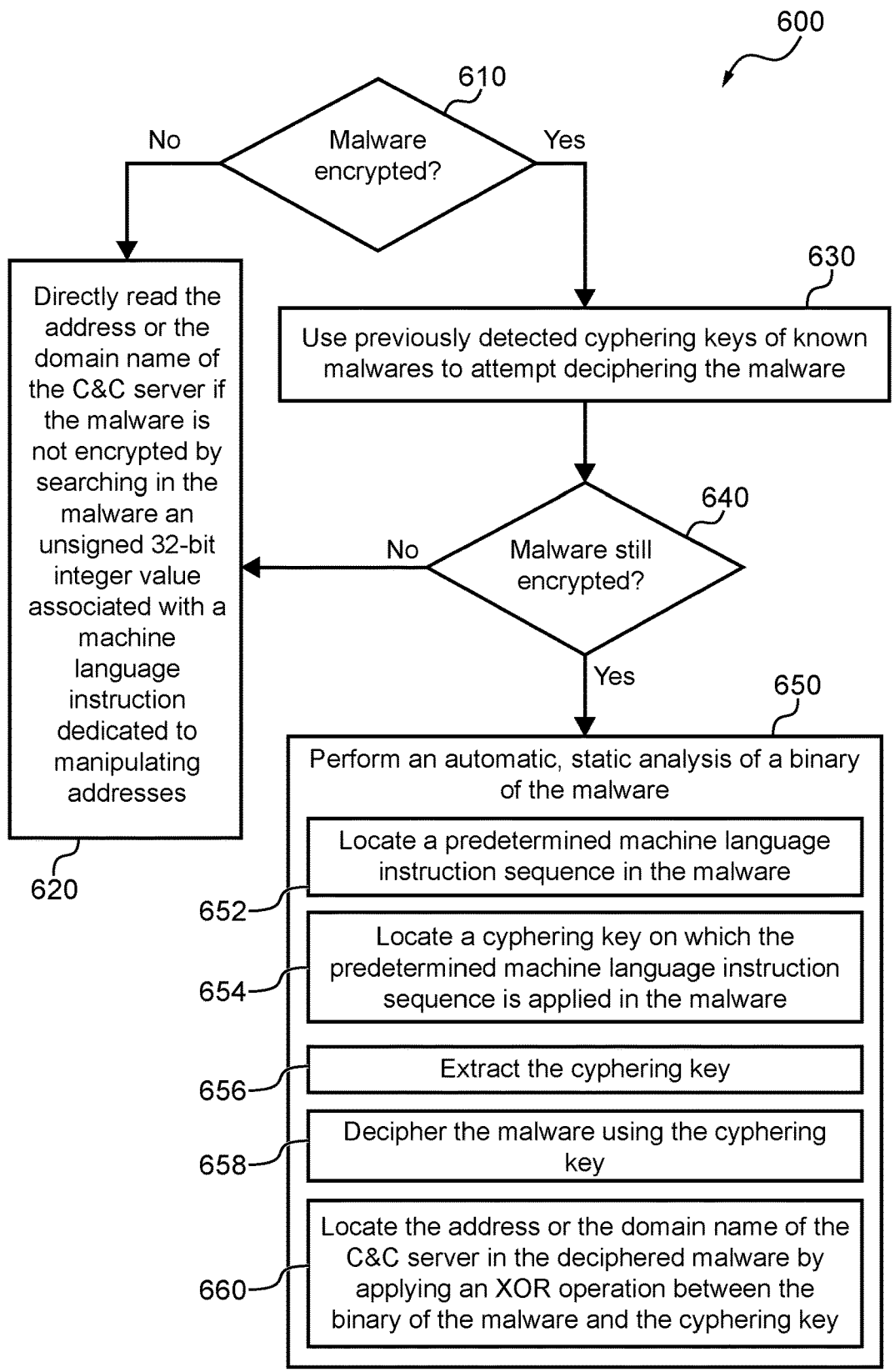
FIG. 8 is a sequence diagram showing detailed operations of the reverse engineering method for extracting an address or a domain name of a C&C server in accordance with an embodiment of the present technology.

FIG. 8 is a sequence diagram showing detailed operations of the reverse engineering method for extracting an address or a domain name of a C&C server in accordance with an embodiment of the present technology.

On FIG. 8, a sequence 600 implementing the reverse engineering method comprises a plurality of operations that may be executed in variable order, some of the operations possibly being executed concurrently, some of the operations being optional. The sequence 600 shows operations that take place in the C&C data collector 130. In an embodiment, the C&C data collector 130 may be part of the infrastructure 100, as illustrated in the example of FIG. 2. Another embodiment is also contemplated, in which the C&C data collector 130 may be a stand-alone component that receives from any entity a request for the extraction from a malware of the address or of the domain name of a C&C server 12. The following paragraphs provide a non-limiting example in which the C&C data collector 130 directly receives the malware from the software decoy 120.

A malware having been received at the infrastructure 100 (operation 420 of FIG. 5A), the C&C data collector 130 verifies whether or not the malware is encrypted at operation 610. If the malware is not encrypted, the C&C data collector 130 directly reads the address or the domain name of the C&C server 12 at operation 620, for example by searching in the malware an unsigned 32-bit integer (uint32) value, or a plain null-terminated string, associated with a machine language instruction dedicated to manipulating addresses.

If the malware is encrypted, the C&C data collector 130 uses previously detected ciphering keys of known malwares at operation 630 to attempt deciphering the malware. At operation 640, the C&C data collector 130 determines whether the malware has been successfully decrypted, at operation 630, using one of the previously detected ciphering keys. If the decryption is found to be successful at operation 640, the C&C data collector 130 directly reads the address or the domain name of the C&C server 12 at operation 620.

If operation 640 reveals that the malware is still encrypted, the C&C data collector 130 performs an automatic, static analysis of a binary of the malware at operation 650. In a non-limiting embodiment, operation 650 may include one or more of sub-operations 652, 654, 656, 658 and 660. At sub-operation 652, the C&C data collector 130 locates a predetermined machine language instruction sequence in the malware. The predetermined machine language instruction sequence may comprise one or more instructions, at least one of these instructions being a rarely used instruction. At sub-operation 654, the C&C data collector 130 locates a ciphering key on which the predetermined machine language instruction sequence is applied in the malware. At sub-operation 656, the C&C data collector 130 extracts the ciphering key. At sub-operation 658, the C&C data collector 130 deciphers the malware using the ciphering key. Then at sub-operation 660, the C&C data collector 130 cates the address or the domain name of the C&C server in the deciphered malware, for example by applying an XOR operation between the binary of the malware and the ciphering key.

Figure 9:
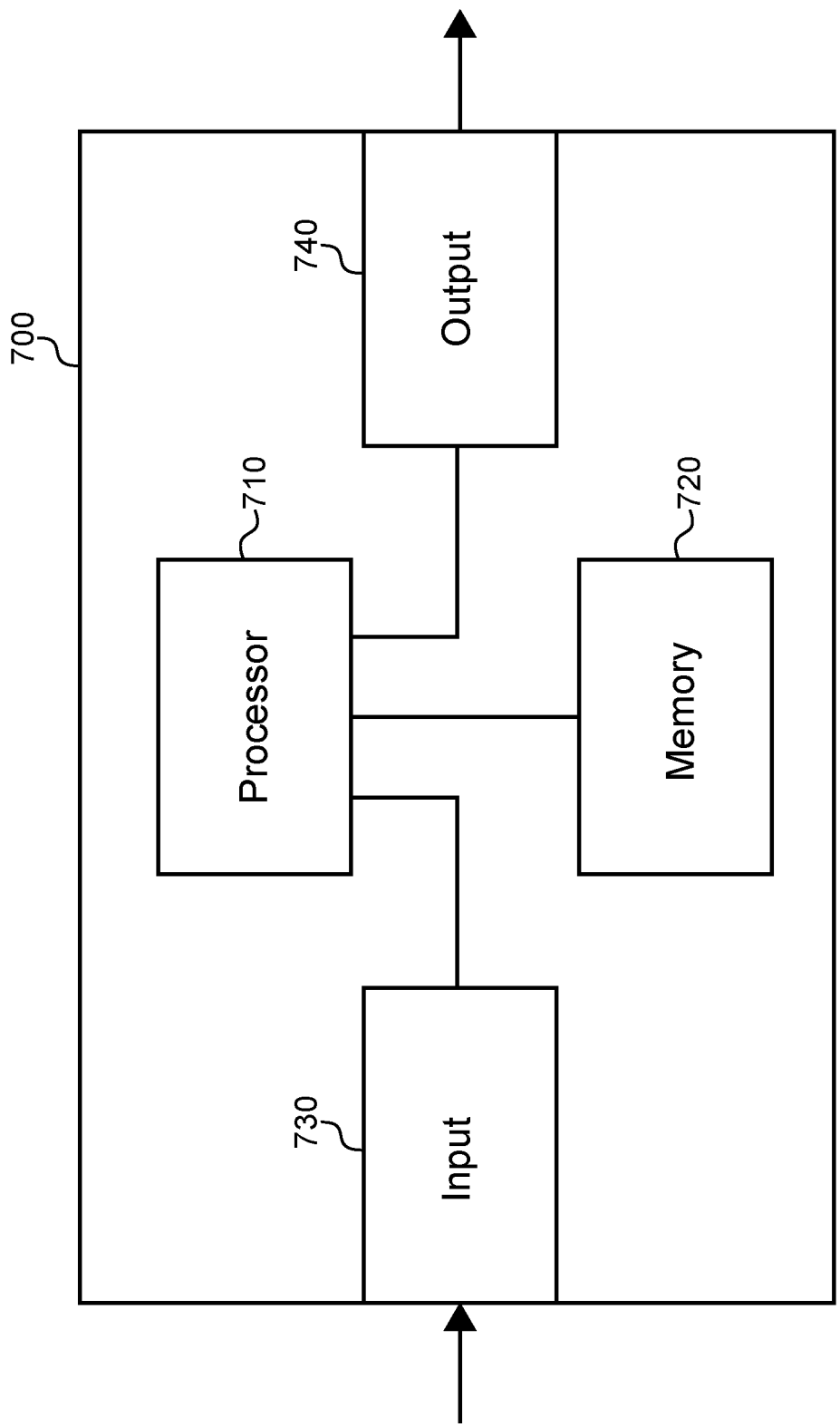
FIG. 9 is a block diagram of a computer platform in accordance with an embodiment of the present technology.

FIG. 9 is a block diagram of a computer platform in accordance with an embodiment of the present technology. A computer platform 700, which is part of the infrastructure 100, comprises a processor 710, a memory device 720, an input device 730 and an output device 740. The memory device 720, the input device 730 and the output device 740 are all operatively connected to and controlled by the processor 710. The memory device 720 may store data related to the functions implemented in the computer platform 700. The memory device 720 may also contain a non-transitory storage medium having stored thereon instructions that the processor 710 may read and execute to implement the functions of the computer platform 700. In an implementation, the input device 730 and the output device 740 may actually consist of a combined input/output device. The input device 730 and the output device 740, or the input/output device as the case may be, allow the computer platform 700 to interconnect with other computer platforms 700 of the infrastructure 100 and/or to communicate with external entities, including without limitation the bots 18, 20, 22 and the C&C server 12. The computer platform 700 may be a general-purpose computer, a server or any system having processing capabilities. The computer platform 700 may actually be formed of a plurality of devices, for example two or more cooperating computers. The computer platform 700 may include one or more processors 710, one or more memory devices 720, one or more input devices 730, one or more output devices 740, and/or one or more input/output devices.

Each of the game server 110, the software decoy 120, the C&C data collector 130, the client 140 and the cleaning component 150 may be implemented on the computer platform 700. In one variant, each one of the game server 110, the software decoy 120, the C&C data collector 130, the client 140 and the cleaning component 150 are implemented on a distinct and respective computer platform 700. In another variant, two (2) or more of the game server 110, the software decoy 120, the C&C data collector 130, the client 140 and the cleaning component 150 may be implemented on one computer platform 700 while the other components of the infrastructure 100 are implemented on one or more other computer platforms 700.

As mentioned hereinabove, the infrastructure 100 may include a plurality of each one of the game server 110, the software decoy 120, the C&C data collector 130, the client 140 and the cleaning component 150. In a non-limiting example, two (2) instances of the client 140 may be implemented on two (2) distinct computer platforms 700. In the same or another non-limiting example, two (2) instances of the software decoy 120 may share a common computer platform 700.

To implement the system for defending an infrastructure against a distributed denial of service (DDoS) attack, a first computer program implementing the cleaning component 150, which is adapted to discard incoming signals having at least one particular of a DDoS attack, is implemented on a computer platform 700. A second computer program configured to pose as the software decoy 120 and adapted to receive a malware intended to infect the software decoy 120 is implemented on the same or on another computer platform 700. A third computer program adapted to implement functions of C&C data collector 130 by receiving the malware from the software decoy and extracting from the malware the address or the domain name of the C&C server 12 is implemented on one of the above mentioned computer platforms or on another computer platform. A fourth computer program configured to pose as the client 140 and adapted to receive the address or the domain name of the C&C server 12 from the C&C data collector 130, use the address or the domain name of the C&C server 12 to connect to the C&C server 12, receive, a command intended by the C&C 12 server to cause the client 140 to participate in the DDoS attack, and forward particulars of the DDoS attack to the cleaning component 150 is implemented on one of the above mentioned computer platforms or on yet another computer platform.

Generally speaking and without limitation, the first computer program that implements the cleaning component 150 may implement operation 450 of FIG. 5B and may further implement one or more of sub-operations 451, 452, and 453 of FIG. 5B. Likewise, the second computer program that implements the software decoy 120 may implement operations 405 to 420 of FIG. 5A. In the same manner, the third computer program that implements the C&C data collector 130 may implement operation 425 of FIG. 5A and all operations of the sequence 600 of FIG. 8. Finally, the fourth computer program that implements the client 140 may implement operations 430, 435 and 440 of FIGS. 5A and 5B.

Figure 10:
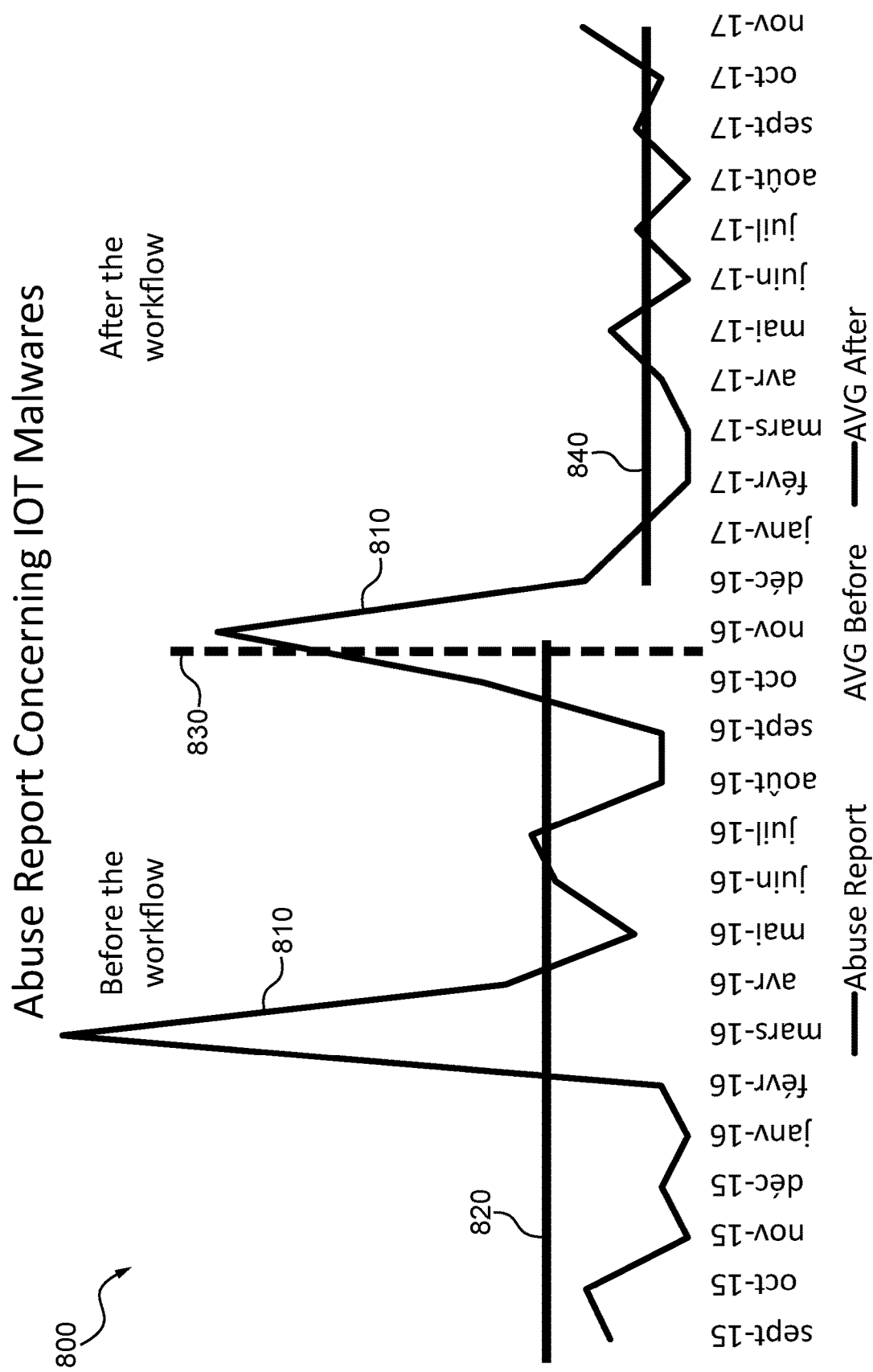
FIG. 10 is a graph showing a variation of a number of abuse notifications in the infrastructure before and after implementation the present technology.

FIG. 10 is a graph showing a variation of a number of abuse notifications in the infrastructure before and after implementation the present technology. In more details, a graph 800 shows a variation 810 of a number of "abuse reports" over time, an abuse being reported when it is found that a component of the infrastructure 100, for example a server, is hosting a C&C server. A line 820 shows an average over time of the variation 810 prior to the introduction, in the infrastructure 100, of the workflow for defending the infrastructure 100 against DDoS attacks. After this introduction at a time 830, there was an initial surge in the detections caused by the workflow revealing previously introduced infections. Thereafter, an average over time 840 of the variation 810 of the number of abuse reports shows a very significant decrease in the number of infections.

Figure 11:
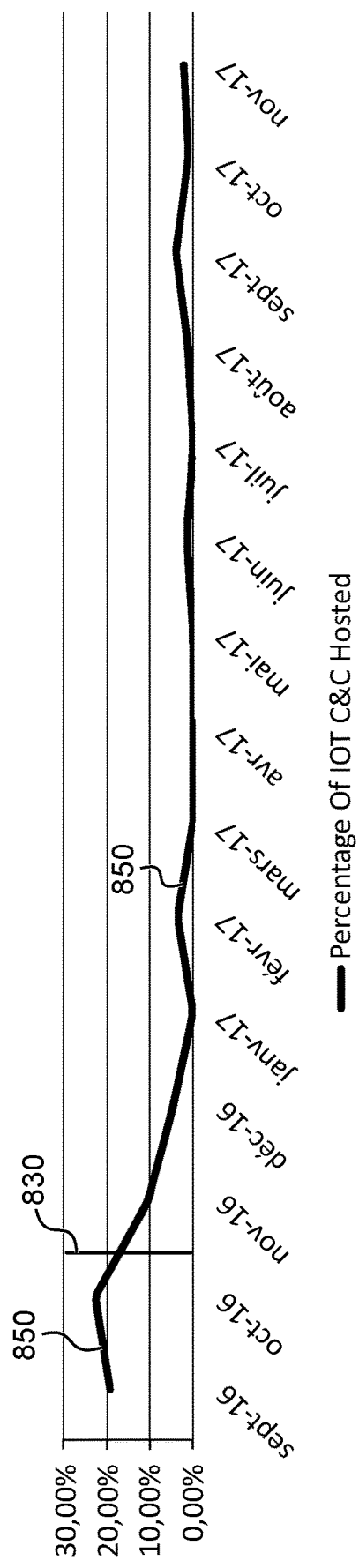
FIG. 11 is a graph showing a variation of a number of C&C servers hosted in the infrastructure before and after implementation the present technology.

FIG. 11 is a graph showing a variation of a number of C&C servers hosted in the infrastructure before and after implementation the present technology. A curve 850 shows a number of infected servers in the infrastructure 100. Prior to the introduction of the workflow at time 830, up to 20-25 percent of the servers were being turned into C&C servers.

Figure 12:
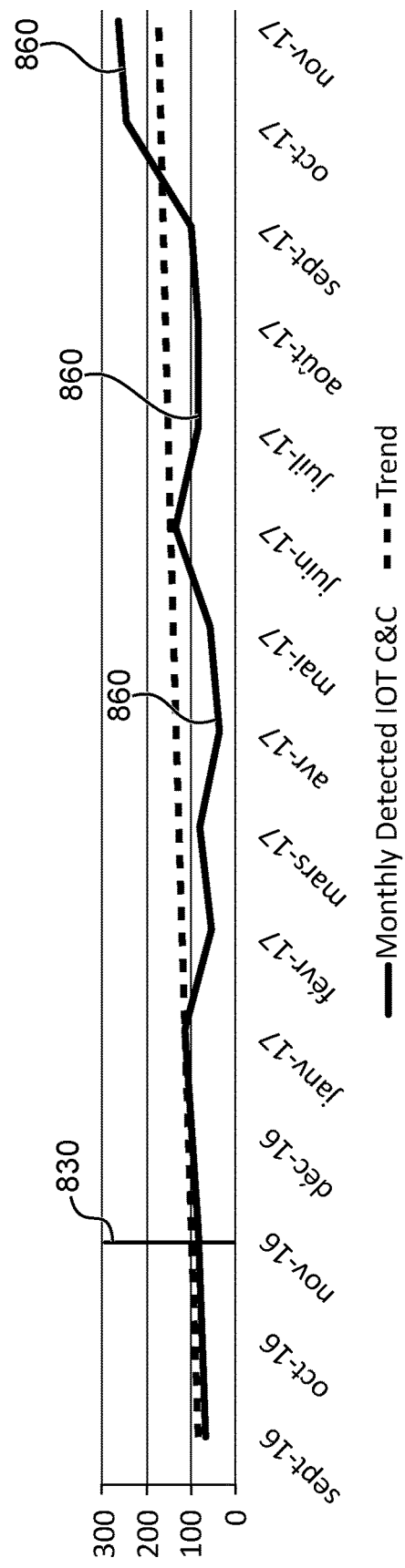
FIG. 12 is a graph showing a worldwide variation of a number of infections in the same timescale as in FIG. 11.

Following the introduction of the workflow, the curve 850 shows that the number of infected servers has fallen to a range of 0-5%. FIG. 12 is a graph showing a worldwide variation of a number of infections in the same timescale as in FIG. 11. A curve 860 and a trend 870 of the curve 860 show that, on a worldwide basis, monthly detections of infections by infected IoT devices is continuously increasing. Comparing the results of FIGS. 11 and 12 shows the efficiency of the present technology.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

The systems and methods for identifying a connection path between a power source and a load implemented in accordance with some non-limiting embodiments of the present technology can be represented as follows, presented in numbered clauses.

Clauses

[Clause 1] A method for defending an infrastructure against a distributed denial of service (DDoS) attack, comprising:
installing a software decoy in the infrastructure;
receiving, at the software decoy, a malware intended to infect the software decoy;
extracting from the malware an address or a domain name of a command and control (C&C) server;
using the address or the domain name of the C&C server to connect a client of the infrastructure to the C&C server;
receiving, at the client, a command intended by the C&C server to cause the client to participate in the DDoS attack;
forwarding particulars of the DDoS attack from the client to a cleaning component; and
discarding, in the cleaning component, incoming signals having at least one of the particulars of the DDoS attack.

[Clause 2] The method of clause 1, wherein the software decoy is configured to pose as a vulnerable device.

[Clause 3] The method of clause 2, further comprising, before receiving the malware at the software decoy:
receiving, at the software decoy, a challenge intended to detect a protection function of the infrastructure; and
forwarding a challenge response from the software decoy.

[Clause 4] The method of any one of clauses 1 to 3, wherein the client is configured to pose as being infected by the malware.

[Clause 5] The method of clause 4, wherein the client implements a protocol of the malware.

[Clause 6] The method of any one of clauses 1 to 5, wherein the particulars of the DDoS attack comprise an address of an intended victim of the DDoS attack.

[Clause 7] The method of clause 6, wherein the particulars of the DDOS attack further comprise a port number of the intended victim of the DDOS attack and an intended duration of the DDoS attack.

[Clause 8] The method of clause 6 or 7, wherein forwarding the particulars of the DDoS attack to the cleaning component is conditional to the intended victim being part of the infrastructure.

[Clause 9] The method of clause 8, further comprising updating a routing table of the infrastructure to cause routing of incoming messages destined to the address of the intended victim toward the cleaning component when the intended victim is part of the infrastructure.

[Clause 10] The method of any one of clauses 1 to 9, wherein discarding, in the cleaning component, the incoming signals having at least one of the particulars of the DDoS attack comprises an element selected from discarding incoming signals carrying spoofed source IP addresses, discarding incoming signals that are not related to previously established connections, discarding incoming signals when a number of incoming signals carrying a same source IP address exceeds a predetermined threshold, and a combination thereof.

[Clause 11] The method of any one of clauses 1 to 10, wherein the address of the C&C server is an IP address.

[Clause 12] The method of any one of clauses 1 to 11, wherein extracting from the malware the address or the domain name of the C&C server comprises:
verifying whether the malware is encrypted; and
directly reading the address or the domain name of the C&C server if the malware is not encrypted.

[Clause 13] The method of clause 12, further comprising searching in the malware an unsigned 32-bit integer value associated with a machine language instruction dedicated to manipulating addresses.

[Clause 14] The method of any one of clauses 1 to 11, wherein extracting from the malware the address or the domain name of the C&C server comprises:
verifying whether the malware is encrypted; and
if the malware is encrypted, using one or more previously detected ciphering keys of known malwares to decipher the malware.

[Clause 15] The method of any one of clauses 1 to 11, wherein extracting from the malware the address or the domain name of the C&C server comprises:
verifying whether the malware is encrypted; and
if the malware is encrypted, performing an automatic, static analysis of a binary of the malware.

[Clause 16] The method of clause 15, further comprising:
locating a predetermined machine language instruction sequence in the malware;
locating a ciphering key on which the predetermined machine language instruction sequence is applied in the malware;
extracting the ciphering key from the malware;
deciphering the malware using the ciphering key; and
locating the address or the domain name of the C&C server in the deciphered malware.

[Clause 17] The method of clause 16, wherein deciphering the malware comprises applying an exclusive OR (XOR) operation between the binary of the malware and the ciphering key.

[Clause 18] The method of clause 16 or 17, wherein the predetermined machine language instruction sequence comprises one or more instructions including at least one rarely used instruction.

[Clause 19] The method of any one of clauses 1 to 18, wherein the software decoy does not install the malware.

[Clause 20] The method of any one of clauses 1 to 19, further comprising:
determining whether a downloader of the malware or the C&C server is hosted in the infrastructure by verifying the address or the domain name of the downloader of the malware or of the C&C server; and
if the downloader of the malware or the C&C server is hosted in a compromised component of the infrastructure, performing an action selected from alerting a customer having content hosted in the compromised component of the infrastructure, placing the compromised component of the infrastructure in quarantine, and a combination thereof.

[Clause 21] A reverse engineering method for locating an address or a domain name of a command and control (C&C) server, comprising:
receiving a malware and, without installing the malware:
locating a predetermined machine language instruction sequence in a binary of the malware;
locating, in the binary of the malware, a ciphering key on which the predetermined machine language instruction sequence is applied;
extracting the ciphering key from the malware;
deciphering the malware using the ciphering key; and
locating the address or the domain name of the C&C server in the deciphered malware.

[Clause 22] The method of clause 21, wherein deciphering the malware comprises applying an exclusive OR (XOR) operation between the binary of the malware and the ciphering key.

[Clause 23] The method of clause 21 or 22, wherein the predetermined machine language instruction sequence comprises one or more instructions including at least one rarely used instruction.

[Clause 24] A system for defending an infrastructure against a distributed denial of service (DDoS) attack, comprising:
a first computer program implementing a cleaning component adapted to discard incoming signals having at least one particular of a DDoS attack;
a second computer program configured to pose as a software decoy and adapted to receive a malware intended to infect the software decoy;
a third computer program implementing a control and command (C&C) data collector adapted to:
receive the malware from the software decoy; and
extract from the malware an address or a domain name of a C&C server; and
a fourth computer program configured to pose as a client and adapted to:
receive the address or the domain name of the C&C server from the C&C data collector;
use the address or the domain name of the C&C server to connect to the C&C server,
receive, a command intended by the C&C server to cause the client to participate in the DDoS attack, and
forward particulars of the DDoS attack to the cleaning component.

[Clause 25] The system of clause 24, further comprising a plurality of interconnected computer platforms, wherein:
functions of the cleaning component, of the software decoy, of the C&C data collector and of the client are implemented on the plurality of interconnected computer platforms;
each computer platform comprises at least one processor and at least one memory operatively connected to the at least one processor; and
in each computer platform, the memory comprises a non-transitory storage medium having stored thereon instructions that the processor of the computer platform reads and executes to implement one or more functions installed on the computer platform.

[Clause 26] The system of clause 24 or 25, wherein the software decoy is configured to pose as a vulnerable device.

[Clause 27] The system of clause 26, wherein the software decoy is further adapted to: receive a challenge intended to detect a protection function of the infrastructure; and forward a challenge response from the software decoy.

[Clause 28] The system of any one of clauses 24 to 27, wherein the client is configured to pose as being infected by the malware.

[Clause 29] The system of clause 28, wherein the client implements a protocol of the malware.

[Clause 30] The system of any one of clauses 24 to 29, wherein the particulars of the DDoS attack comprise an address of an intended victim of the DDoS attack.

[Clause 31] The system of clause 30, wherein the particulars of the DDOS attack further comprise a port number of the intended victim of the DDOS attack and an intended duration of the DDoS attack.

[Clause 32] The system of clause 30 or 31, wherein the client is further adapted to only forward the particulars of the DDoS attack to the cleaning component when the intended victim is part of the infrastructure.

[Clause 33] The system of clause 32, further comprising a routing table, the routing table being adapted to cause routing of incoming messages destined to the address of the intended victim toward the cleaning component when the intended victim is part of the infrastructure.

[Clause 34] The system of any one of clauses 24 to 33, wherein the cleaning component is further adapted to discard incoming signals carrying spoofed source IP addresses.

[Clause 35] The system of any one of clauses 24 to 34, wherein the cleaning component is further adapted to discard incoming signals that are not related to previously established connections.

[Clause 36] The system of any one of clauses 24 to 33, wherein the cleaning component is further adapted to discard incoming signals when a number of incoming signals carrying a same source IP address exceeds a predetermined threshold.

[Clause 37] The system of any one of clauses 24 to 36, wherein the address of the C&C server is an IP address.

[Clause 38] The system of any one of clauses 24 to 37, wherein the C&C data collector is further adapted to extract from the malware the address or the domain name of the C&C server by directly reading the address or the domain name of the C&C server if the malware is not encrypted.

[Clause 39] The system of clause 38, wherein the C&C data collector is further adapted to search in the malware an unsigned 32-bit integer value associated with a machine language instruction dedicated to manipulating addresses.

[Clause 40] The system of any one of clauses 24 to 37, wherein the C&C data collector is further adapted to extract from the malware the address or the domain name of the C&C server by using one or more previously detected ciphering keys of known malwares to decipher the malware.

[Clause 41] The system of any one of clauses 24 to 37, wherein the C&C data collector is further adapted to extract from the malware the address or the domain name of the C&C server by performing an automatic, static analysis of a binary of the malware.

[Clause 42] The system of clause 41, wherein the C&C data collector is further adapted to:
locate a predetermined machine language instruction sequence in the malware;
locate a ciphering key on which the predetermined machine language instruction sequence is applied in the malware;
extract the ciphering key from the malware;
decipher the malware using the ciphering key; and
locate the address or the domain name of the C&C server in the deciphered malware.

[Clause 43] The system of clause 42, wherein the C&C data collector is further adapted to decipher the malware by applying an exclusive OR (XOR) operation between the binary of the malware and the ciphering key.

[Clause 44] The system of clause 42 or 43, wherein the predetermined machine language instruction sequence comprises one or more instructions including at least one rarely used instruction.

[Clause 45] The system of any one of clauses 24 to 44, wherein the software decoy does not install the malware.

[Clause 46] The system of any one of clauses 24 to 45, wherein the system is further adapted to:
determine whether a downloader of the malware or the C&C server is hosted in the infrastructure by verifying the address or the domain name of the downloader of the malware or of the C&C server; and
if the downloader of the malware or the C&C server is hosted in a compromised component of the infrastructure, cause the infrastructure to perform an action selected from alerting a customer having content hosted in the compromised component of the infrastructure, placing the compromised component of the infrastructure in quarantine, and a combination thereof.

[Clause 47] A system for locating an address or a domain name of a command and control (C&C) server, the system comprising:
one or more computer programs adapted to receive a malware and, without installing the malware:
locate a predetermined machine language instruction sequence in a binary of the malware;
locate, in the binary of the malware, a ciphering key on which the predetermined machine language instruction sequence is applied;
extract the ciphering key from the malware;
decipher the malware using the ciphering key; and
locate the address or the domain name of the C&C server in the deciphered malware.

[Clause 48] The system of clause 47, further comprising a computer platform comprising at least one processor and at least one memory operatively connected to the at least one processor, wherein the one or more computer programs are implemented on the computer platform.

[Clause 49] The system of clause 47 or 48, wherein the one or more computer programs are adapted to apply an exclusive OR (XOR) operation between the binary of the malware and the ciphering key.

[Clause 50] The system of any one of clauses 47 to 49, wherein the predetermined machine language instruction sequence comprises one or more instructions including at least one rarely used instruction.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for defending an infrastructure against a distributed denial of service (DDoS) attack, comprising:
   receiving, at a software decoy of the infrastructure, a malware intended to infect the software decoy;
   receiving the malware from the software decoy at a command and control (C&C) data collector of the infrastructure;
   extracting from the malware, by the C&C data collector, an address or a domain name of a C&C server;
   sending, from the C&C data collector to a client of the infrastructure, the address or the domain name of the C&C server;
   using, by the client, the address or the domain name of the C&C server to initiate a connection of the client to the C&C server;
   after the initiation of the connection of the client to the C&C server, receiving, at the client, a command intended by the C&C server to cause the client to participate in the DDoS attack;
   forwarding particulars of the DDoS attack from the client to a cleaning component of the infrastructure; and
   discarding, in the cleaning component, incoming signals having at least one of the particulars of the DDoS attack.

2. The method of claim 1, further comprising, before receiving the malware at the software decoy:
   receiving, at the software decoy, a challenge intended to detect a protection function of the infrastructure; and
   forwarding a challenge response from the software decoy.

3. The method of claim 1, wherein the particulars of the DDoS attack comprise an address of an intended victim of the DDoS attack.

4. The method of claim 3, further comprising updating a routing table of the infrastructure to cause routing of incoming messages destined to the address of the intended victim toward the cleaning component when the intended victim is part of the infrastructure.

5. The method of claim 1, wherein discarding, in the cleaning component, the incoming signals having at least one of the particulars of the DDoS attack comprises discarding incoming signals carrying spoofed source IP addresses, discarding incoming signals that are not related to previously established connections, or discarding incoming signals when a number of incoming signals carrying a same source IP address exceeds a predetermined threshold.

6. The method of claim 1, further comprising:
   determining whether a downloader of the malware or the C&C server is hosted in the infrastructure by verifying the address or the domain name of the downloader of the malware or of the C&C server; and
   if the downloader of the malware or the C&C server is hosted in a compromised component of the infrastructure, alerting a customer having content hosted in the compromised component of the infrastructure or placing the compromised component of the infrastructure in quarantine.

7. The method of claim 1, wherein extracting from the malware the address or the domain name of the C&C server comprises:
   determining that the malware is not encrypted; and
   after determining that the malware is not encrypted, directly reading the address or the domain name of the C&C server from the malware.

8. The method of claim 1, wherein extracting from the malware the address or the domain name of the C&C server comprises:
   determining that the malware is encrypted; and
   after determining that the malware is encrypted, using one or more previously detected ciphering keys of known malwares to decipher the malware.

9. The method of claim 1, wherein extracting from the malware the address or the domain name of the C&C server comprises:
   determining that the malware is encrypted; and
   performing an automatic, static analysis of a binary of the malware.

10. The method of claim 9, wherein performing the automatic, static analysis of the binary of the malware comprises:
    locating a predetermined machine language instruction sequence in the malware;
    locating a ciphering key on which the predetermined machine language instruction sequence is applied in the malware;
    extracting the ciphering key from the malware;
    deciphering the malware using the ciphering key; and
    locating the address or the domain name of the C&C server in the deciphered malware.

11. The method of claim 1, wherein extracting from the malware the address or the domain name of the C&C server comprises directly reading the address or the domain name of the C&C server from the malware.

12. A system for defending an infrastructure against a distributed denial of service (DDoS) attack, wherein the system comprises at least one processor and memory comprising executable instructions, and wherein the system further comprises:
    a cleaning component, wherein the instructions, when executed by the at least one processor, cause the cleaning component to discard incoming signals having at least one particular of a DDoS attack;
    a software decoy, wherein the instructions, when executed by the at least one processor, cause the software decoy to receive a malware intended to infect the software decoy;
    a command and control (C&C) data collector, wherein the instructions, when executed by the at least one processor, cause the C&C data collector to:
      receive the malware from the software decoy, and
      extract from the malware an address or a domain name of a C&C server; and
    a client, wherein the instructions, when executed by the at least one processor, cause the client to:
      receive the address or the domain name of the C&C server from the C&C data collector,
      use the address or the domain name of the C&C server to initiate a connection of the client to the C&C server,
      after the initiation of the connection of the client to the C&C server, receive, a command intended by the C&C server to cause the client to participate in the DDoS attack, and
      forward particulars of the DDoS attack to the cleaning component.

13. The system of claim 12, wherein the instructions, when executed by the at least one processor, cause the C&C data collector to extract from the malware the address or the domain name of the C&C server by:
    directly reading the address or the domain name of the C&C server if the malware is not encrypted;
    using one or more previously detected ciphering keys of known malwares to decipher the malware server if the malware is encrypted; and if the malware is still encrypted after using the one or more previously detected ciphering keys, performing an automatic, static analysis of a binary of the malware.

14. The system of claim 13, wherein the instructions, when executed by the at least one processor, cause the C&C data collector to perform the automatic, static analysis of the binary of the malware by:
locating a predetermined machine language instruction sequence in the malware;
locating a ciphering key on which the predetermined machine language instruction sequence is applied in the malware;
extracting the ciphering key from the malware;
deciphering the malware using the ciphering key; and
locating the address or the domain name of the C&C server in the deciphered malware.

15. The system of claim 14, wherein the predetermined machine language instruction sequence comprises one or more instructions including at least one instruction part of a signature of the malware.

16. The system of claim 12, wherein the software decoy does not install the malware.

17. The system of claim 12, wherein the instructions, when executed by the at least one processor, cause the system to:
determine whether a downloader of the malware or the C&C server is hosted in the infrastructure by verifying the address or the domain name of the downloader of the malware or of the C&C server; and
if the downloader of the malware or the C&C server is hosted in a compromised component of the infrastructure, cause the infrastructure to alert a customer having content hosted in the compromised component of the infrastructure or place the compromised component of the infrastructure in quarantine.

18. A method for defending an infrastructure against a distributed denial of service (DDoS) attack, comprising:
receiving, at a software decoy of the infrastructure, a malware intended to infect the software decoy;
receiving the malware from the software decoy at a command and control (C&C) data collector of the infrastructure;
extracting from the malware, by the C&C data collector, an address or a domain name of a C&C server;
sending, from the C&C data collector to a client of the infrastructure, the address or the domain name of the C&C server;
using, by the client, the address or the domain name of the C&C server to initiate a connection of the client to the C&C server;
after the initiation of the connection of the client to the C&C server, receiving, at the client, a command intended by the C&C server to cause the client to participate in the DDoS attack;
forwarding an address of a target of the DDoS attack from the client to a cleaning component of the infrastructure;
determining that the address of the target is part of the infrastructure; and
after determining that the address of the target is part of the infrastructure, updating a routing table of the infrastructure to cause routing of incoming messages destined to the address of the target toward the cleaning component.

* * * * *